(12) United States Patent
Cauwenberghs et al.

(10) Patent No.: US 6,865,490 B2
(45) Date of Patent: Mar. 8, 2005

(54) METHOD FOR GRADIENT FLOW SOURCE LOCALIZATION AND SIGNAL SEPARATION

(75) Inventors: Gert Cauwenberghs, Baltimore, MD (US); Milutin Stanacevic, Baltimore, MD (US); George Zweig, Santa Fe, NM (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/429,945

(22) Filed: May 6, 2003

(65) Prior Publication Data

US 2004/0078144 A1 Apr. 22, 2004

Related U.S. Application Data

(60) Provisional application No. 60/377,605, filed on May 6, 2002.

(51) Int. Cl.[7] .............................. G01V 1/28; G06F 19/00
(52) U.S. Cl. .............................. 702/17; 702/14; 702/94; 702/95
(58) Field of Search ............................. 702/17, 91, 94, 702/95, 104, 158, 189–191, 14; 367/27, 31; 381/71.1, 150, 337; 342/378, 444

(56) References Cited

U.S. PATENT DOCUMENTS 6,185,309 B1 * 2/2001 Attias ........................ 381/94.1
6,512,996 B1 * 1/2003 Praskovsky et al. ........ 702/189
6,670,920 B1 * 12/2003 Herrick ...................... 342/378

* cited by examiner

Primary Examiner—Bryan Bui
(74) Attorney, Agent, or Firm—Whitham, Curtis & Christofferson, P.C.

(57) ABSTRACT

A method of separating and localizing sources of traveling waves, by obtaining linearly independent time-differentiated instantaneous observations of the sources, from spatial derivatives of the traveling wave acquired using a distributed sensor or a sensor array. The sources are blindly separated by direct application of (static) independent component analysis on the time-differentiated observations, yielding both the sources and their direction cosines relative to the sensor geometry. The method is suited for arrays of small aperture, with dimensions shorter than the coherence length of the waves. In one preferred embodiment, three sources are separated and localized from differential observations on four coplanar sensors positioned on the corners of a square. Applications include miniature microphone arrays for intelligent hearing aids with adaptive suppression of interfering signals and nonstationary noise, and integrated RF arrays for resolving or localizing multiple users or channels from a base station or mobile unit.

20 Claims, 3 Drawing Sheets

METHOD FOR GRADIENT FLOW SOURCE LOCALIZATION AND SIGNAL SEPARATION

RELATED APPLICATIONS

The present patent application claims the benefit of priority from U.S. provisional application 60/377,605, filed on May 6, 2002.

FIELD OF THE INVENTION

The invention is directed toward separating and localizing a mixture of broadband signals from observation on a compact array of spatially distributed sensors, each signal being generated by a traveling wave source impinging on the array, arriving from different directions. The sensors measure the field resulting from the traveling wave sources, which could be acoustic, sonar, electromagnetic, or possibly other forms of radiation.

BACKGROUND OF THE INVENTION

Wavefront sensing in space for localizing sound has been in practice since the pioneering work by Blumlein (as described in British Patent 394325 to Blumlein, "Improvements in and Relating to Sound-Transmission, Sound-Recording and Sound-Reproducing Systems", 1933), a precursor to the advances in binaural signal processing that we know today. The direction of a traveling wave can be inferred directly by sensing spatial differentials on a sub-wavelength scale, a principle exploited in biology, e.g., by the Sarcophagid Parasitoid Fly Emblemasoma sp. (Robert, D., R. N. Miles and R. R. Hoy, "Tympanal Hearing in the Sarcophagid Parasitoid Fly Emblemasoma sp.: the Biomechanics of Directional Hearing", 1999). Differentials of a sound pressure field measured in different directions can be linearly combined to implement steerable spatial filters for acoustic beamforming (U.S. Pat. No. 6,041,127 to Elko). Differential sensing for directional sensing is also the guiding principle in monopulse radar and sonar (e.g., U.S. Pat. No. 6,356,231 to Zheng, et al.).

Super-resolution spectral methods are commonly used to localize multiple narrowband sources (Haykin, S. *Adaptive Filter Theory*, $2^{nd}$. Ed., Prentice Hall, 1991). Yet little is known about the problem of localizing and separating multiple broadband sources. Separating mixtures of delayed sources has been addressed with Independent Component Analysis (ICA, e.g., U.S. Pat. No. 5,383,164 to Sejnowski, et al., U.S. Pat. No. 5,706,402 to Bell, U.S. Pat. No. 6,185,309 to Attias, and U.S. Pat. No. 6,424,960 to Lee, et al.), but requires a large number of parameters to obtain sufficient temporal resolution for precise localization. Adapting delays (U.S. Pat. No. 5,675,659 to Torkkola and U.S. Pat. No. 5,694,474 to Ngo, et al.) reduces the number of parameters, but is prone to local optima.

The approach we present here avoids the problem of separating delayed mixtures by observing spatial differentials of the field, which convey an instantaneous linear mixture of the time-differentiated sources. The resulting formulation is equivalent to that of standard (instantaneous linear) ICA, and a number of approaches exist for such blind separation, e.g. as demonstrated in U.S. Pat. No. 5,315,532 to Comon and U.S. Pat. No. 5,706,402 to Bell, and some leading to efficient VLSI implementation (e.g., Cohen, M. H. and A. G. Andreou, "Current-Mode Subthreshold MOS Implementation of Herault-Jutten Autoadaptive Network," *IEEE J. Solid-State Circuits*, vol. 27, pp. 714–727, May 1992). The mixing coefficients obtained from ICA yield the angles of the incoming waves. Therefore the method claimed here can be seen as a combination of differential wave sensing and ICA, performing at once blind separation and localization of traveling waves.

Spatial differentials can be either obtained using gradient sensors (e.g., differential microphones as customarily used in hearing aids, as shown in U.S. Pat. No. 5,033,090 to Weinrich), or from discrete observations on a grid using a sensor array. The presented technique makes it possible to separate multiple signals with miniature distributed sensors or sensor arrays that are integrated on a single MEMS or VLSI chip.

SUMMARY OF THE INVENTION

The invention, termed gradient flow, is a method of separating and localizing sources of traveling waves that impinge on an array of sensors, without the need of resolving time delays of arrivals as customarily performed in beamforming. Gradient flow converts the problem of separating unknown delayed mixtures of sources into a simpler problem of separating unknown instantaneous mixtures of the time-differentiated sources, obtained by acquiring or computing spatial and temporal derivatives on the array. The linear coefficients in the instantaneous mixture directly represent the delays, which in turn determine the direction angles of the sources. This formulation is attractive, since it allows to separate and localize waves of broadband signals using standard tools of independent component analysis (ICA). Direct application of ICA on the spatial and temporal derivatives of the field yield the sources along with their direction angles. The technique is suited for arrays of small aperture, with dimensions shorter than the coherence length of the waves. Applications of gradient flow include miniature microphone arrays for intelligent hearing aids with adaptive suppression of interfering signals and nonstationary noise, and integrated RF arrays for separating or localizing multiple users or channels from a base station or mobile unit.

DETAILED DESCRIPTION

We consider linear mixtures of traveling waves emitted by sources at various locations, and observed over a distribution of sensors in space. The distribution of sensors could be continuous or discrete. In what follows we assume an array of discrete sensors, but the theory applies as well to sensors distributed continuously in space. However, the sources are assumed to be discrete.

The usual approach of the prior art to wideband separation tries to find the sources by combining the received signals at multiple delayed times. This is computationally expensive. The present approach proposed here reduces the problem of separating mixtures of delayed sources to that of separating an instantaneous mixture of signals related to the sources through a succession of time derivatives of increasing order.

Let the coordinate system r be centered in the array so that the origin coincides with the "center of mass" of the sensor distribution. Referring to the geometry in FIG. 1, we define $\tau(r)$ 11 as the time lag between the wavefront at point r 12 and the wavefront at the center of the array 13, i.e. the propagation time $\tau(r)$ is referenced to the center of the array.

In the far-field approximation, the distance from the source 14 is much larger than the dimensions of the sensor array. This is a sensible approximation for an acoustic or RF integrated MEMS or VLSI array with dimensions typically smaller than 1 cm. In this case, the wavefront delay $\tau(r)$ is approximately linear in the projection of r on the unit vector u 15 pointing towards the source, $$\tau(r) \approx \frac{1}{c} r \cdot u \qquad \text{Equation 1}$$

where c is the speed of wave propagation (e.g., acoustic or electromagnetic).

The far-field approximation is not essential to carry through the method of the invention, but it simplifies the exposition. Since the analysis focuses on differentials in the field at very small spatial scale, in the limit approximating spatial derivatives, the far-field approximation holds even for distances close to any of the sources. Likewise, effects of attenuation along the path of wave propagation can be neglected over spatial scales of interest here. It is straightforward to those skilled in the art to extend the concepts and methods described herein to small effects of curvature in the wavefront, and attenuation in propagation.

Figure 1:
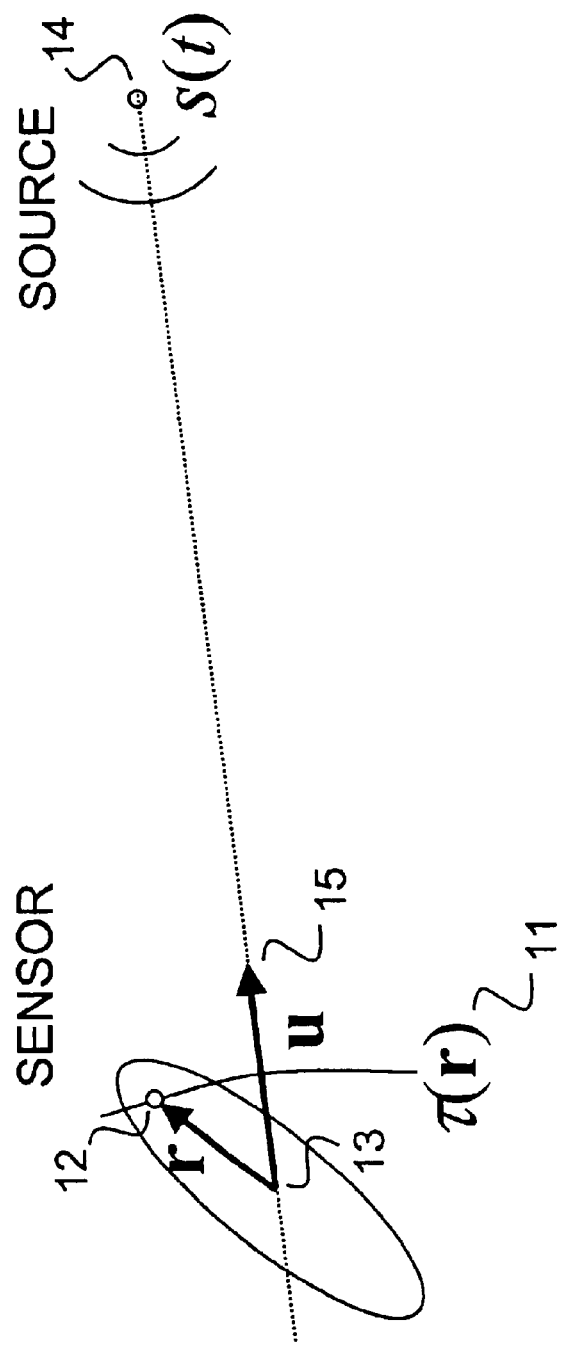
FIG. 1 is an illustration of a traveling wave observed by a sensor, and the dependence of the observed signal on the position of the sensor and the direction of the traveling wave.
Figure 2:
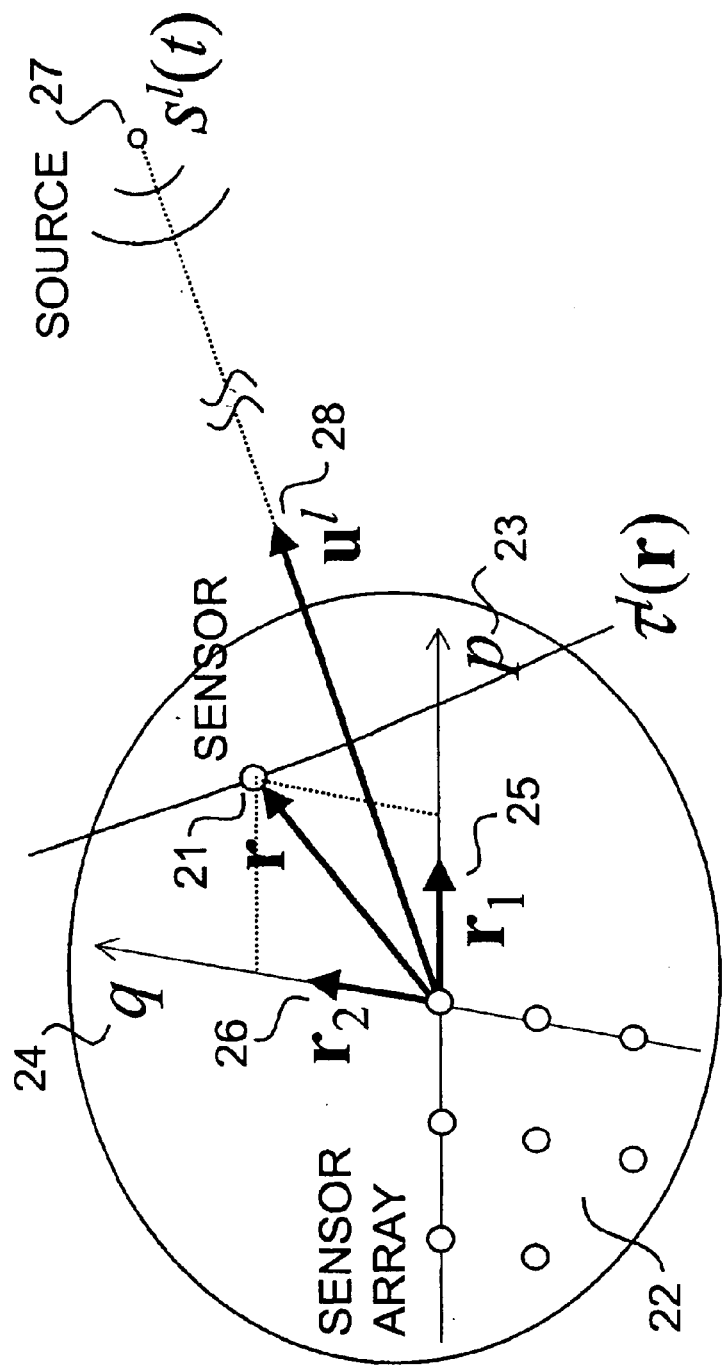
FIG. 2 is an illustration of a spatially distributed sensor or array of sensors observing a traveling wave, and the direction of the traveling wave relative to the geometry of the distributed sensor or sensor array as determined by its principal axes.

Spatial sensing of the field by a distributed sensor or a collection of sensors, to infer spatial properties of a source or a mixture of sources, is illustrated in FIGS. 1 and 2.

Let x(r,t) be the signal mixture picked up by a sensor at position r 21. As one special case we will consider a two-dimensional array of sensors 22, with position coordinates p 23 and q 24 so that $r_{pq} = pr_1 + qr_2$ with orthogonal vectors $r_1$ 25 and $r_2$ 26 along direction p and q in the sensor plane. It is straightforward to those skilled in the art to extend concepts and methods described herein to one-dimensional and three-dimensional sensor geometries.

In the far-field approximation (Equation 1), each source signal $s^l$ 27 contributing to $x_{pq}$ is advanced in time by $\tau_{pq}^l = p\tau_1^l + q\tau_2^l$, where $$\tau_1^l = \frac{1}{c} r_1 \cdot u^l, \text{ and } \tau_2^l = \frac{1}{c} r_2 \cdot u^l \qquad \text{Equation 2}$$

are the inter-time differences (ITD) of source 1 between adjacent sensors on the grid along the p and q place coordinates, respectively. Knowledge of the angle coordinates $\tau_1^l$ and $\tau_2^l$ uniquely determines, through Equation 2, the direction vector $u^l$ 28 along which source $s^l$ 27 impinges the array, in reference to directions p 23 and q 24. Here we assume that the sources impinge on top, not on bottom, of the array. This is a reasonable assumption for an integrated MEMS or VLSI array since the substrate masks any source impinging from beneath.

A mixture of l=1, 2, . . . L sources is acquired in the sensor plane {p,q} according to $$x_{pq}(t) = \sum_{l=1}^{L} s^l(t - \tau_{pq}^l) + n_{pq}(t) \qquad \text{Equation 3}$$

$$\approx \sum_{l=1}^{L} s^l(t + (p\tau_1^l + q\tau_2^l)) + n_{pq}(t)$$

where $n_{pq}(t)$ represents additive noise in the sensor observations. Although not essential, we will assume that the observation noise is independent across sensors.

The usual approach to blind source separation and localization attempts to infer both the unknown sources $s^l$ and their direction coordinates $\tau_1^l$ and $\tau_2^l$, by resolving explicit time delays in the mixture model of Equation 3.

Based on the models just described with reference to FIG. 1 and FIG. 2, we now proceed with describing the gradient-based method of the present invention.

The present method resolves temporal derivatives, rather than delays, in the linearly combined signals by taking spatial gradients of x along p and q. The advantage of this technique is that it effectively reduces the problem of estimating $s^l(t)$ and $\tau_i^l$ to that of separating instantaneous (time-differentiated) mixtures of the independent source signals.

Different linear combinations of the L signals $s^l$ are thus obtained by taking spatial derivatives of various orders i and j along the position coordinates p and q, around the origin p=q=0:

$$\xi(t) = \frac{\partial^{i+j}}{\partial p^i \partial q^j} x_{pq}(t) \bigg|_{p=q=0} = \sum_{l=1}^{L} (\tau_1^l)^i (\tau_2^l)^j \frac{d^{i+j}}{dt^{i+j}} s^l(t) + v_{ij}(t) \qquad \text{Equation 4}$$

where $v_{ij}$ are the corresponding spatial derivatives of the sensor noise $n_{pq}$ around the center. The point here is that all signals $s^l$ in Equation 4 are differentiated to the same order i+j in time. Therefore, taking spatial derivatives $\xi_{ij}$ of order $i+j \leq k$, and differentiating $\xi_{ij}$ to order k-(i+j) in time yields a number of different linear observations in the kth-order time derivatives of the signals $s^l$.

The issue of linear independence will be revisited when we consider the geometry of the source angles relative to that of the sensors further below. More linearly independent observations can be obtained by increasing the order k of differentials, and by increasing the number of spatial sensing dimensions from two to three.

In practice, spatial derivatives in Equation 4 are approximated by discrete sampling on the grid $x_{pq}(t)$. Finding the proper sampling coefficients on a grid to approximate derivatives is a well studied problem in digital signal processing (see Rabiner, L. R. and R. W. Schafer, "On the Behavior of Minimax Relative Error FIR Digital Differentiators," *Bell System Technical Journal*, vol. 53, pp. 333–361, 1974). For dense sensor arrays, an alternative is to approximate the derivatives using moments over the sensor distribution, giving estimates that are more robust to noise. Distributed sensors that acquire spatial gradients directly are also implementable. For instance, acoustic velocity sensors directly measure gradients of the pressure field.

As a preferred embodiment of the invention, consider the first-order case k=1:

$$\xi_{00}(t) = \sum_i s^i(t) + v_{00}(t),$$ Equation 5

$$\xi_{10}(t) = \sum_i \tau_1^i \dot{s}^i(t) + v_{10}(t),$$

$$\xi_{01}(t) = \sum_i \tau_2^i \dot{s}^i(t) + v_{01}(t).$$

Figure 3:
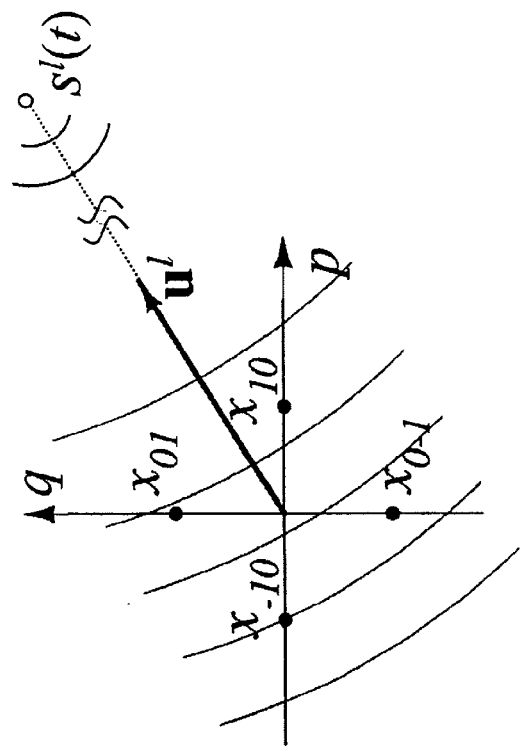
FIG. 3 shows an illustration of one preferred embodiment of the invention, using a geometry of four coplanar sensors placed at equal distance from the origin, spanning a diamond, and also shows the three derivative equations for an array having four sensors arranged in a diamond pattern.

Estimates of $\xi_{00}$, $\xi_{10}$ and $\xi_{01}$ (precise up to terms at least of third order) are obtained with just four sensors, as shown in FIG. 3:

$$\xi_{00} \approx \frac{1}{4}(x_{-1,0} + x_{1,0} + x_{0,-1} + x_{0,1})$$ Equation 6

$$\xi_{10} \approx \frac{1}{2}(x_{1,0} - x_{-1,0})$$

$$\xi_{01} \approx \frac{1}{2}(x_{0,1} - x_{0,-1})$$

Taking the time derivative of $\xi_{00}$, we thus obtain from the sensors a linear instantaneous mixture of the time-differentiated source signals, $$\begin{bmatrix} \dot{\xi}_{00} \\ \dot{\xi}_{10} \\ \dot{\xi}_{01} \end{bmatrix} \approx \begin{bmatrix} 1 \cdots 1 \\ \tau_1^1 \cdots \tau_1^L \\ \tau_2^1 \cdots \tau_2^L \end{bmatrix} \begin{bmatrix} \dot{s}^1 \\ \vdots \\ \dot{s}^L \end{bmatrix} + \begin{bmatrix} \dot{v}_{00} \\ \dot{v}_{10} \\ \dot{v}_{01} \end{bmatrix}$$ Equation 7 an equation in the standard form x=As+n, where x is given and the mixing matrix A and sources s are unknown.

Ignoring for now the noise term n (and for a square matrix, L=3) this problem setting is standard in Independent Component Analysis (ICA) for blind source separation. ICA specifies some sort of statistical independence assumption on the sources s, either in distribution over amplitude or over time, so obtain estimates of the unknown sources from the unknown mixtures. Various formulations of ICA exist (e.g., U.S. Pat. No. 5,315,532 to Comon and U.S. Pat. No. 5,706,402 to Bell), and it is outside the scope of the invention to specify a specific form. It suffices to specify that the form of ICA assumed here is static, in that it assumes that the observations contain static (instantaneous) linear mixtures of the sources. Note that this definition of static ICA includes methods for blind source separation that make use of temporal structure in the dynamics within the sources themselves, as long as the observed mixture of the sources is static. In contrast, 'convolutive' ICA techniques explicitly assume convolutive or delayed mixtures in the source observations. Convolutive ICA techniques (e.g., U.S. Pat. No. 5,675,659 to Torkkola, U.S. Pat. No. 6,185,309 to Attias and U.S. Pat. No. 6,424,960 to Lee, et al.) are usually much more involved and require a large number of parameters and long adaptation time horizons for proper convergence.

ICA produces, at best, an estimate ŝ that recovers the original sources s up to arbitrary scaling and permutation. The direction cosines $\tau_i^1$ are found from the ICA estimate of A, after first normalizing each column (i.e., each source estimate) so that the first row of the estimate Â, like the real A according to Equation 7, contains all ones. This simple procedure together with Equation 2 yields estimates of the direction vectors $\hat{u}^1$ along with the source estimates $\hat{s}^1$ (t), which are obtained by integrating the components of ŝ over time and removing the DC components.

It is interesting to note the similarity between Equation 7, with L=1, and optical flow for constraint-solving velocity estimation in a visual scene (Barron, J. L., D. J. Fleet and S. Beauchemin, "Performance of Optical Flow Techniques," *International Journal of Computer Vision*, vol. 12 (1), pp. 43–77, 1994). The method of the invention is termed "gradient flow" in that it expresses differentials in wave propagation.

The presence of the noise term n complicates the estimation of s and A. Assume for now a standard (static) formulation of ICA (e.g., U.S. Pat. No. 5,706,402 to Bell) that attempts to linearly unmix the observations x:

$$\hat{s} = \hat{A}^{-1}x = \hat{A}^{-1}As - \hat{A}^{-1}n$$

where A is square and invertible. Assume also a reasonable ICA estimate Â so that Equation 8 reduces to $\hat{s} \approx s - A^{-1}n$, disregarding arbitrary permutation and scaling in the source estimates. The error term $e \equiv -A^{-1}n$ contributes variance to the estimate ŝ; in general the noise n will also affect the estimate Â and produce a bias term in ŝ according to Equation 8.

The functional form of the error e allows us to estimate the noise characteristics of the source estimates, without considering details on how ICA obtained these estimates. The covariance of the estimation error is $E[ee^T] = A^{-1}E[nn^T](A^{-1})^T$. In other words, the error covariance depends on the covariance of the sensor noise, the geometry of the sensor array, and the orientation of the sources $u^1$ as determined by the mixing matrix A.

For example, consider the case k=1, suitable for a miniature array. A in Equation 7 is square when L=3. The determinant of A can be geometrically interpreted as the volume of the polyhedron spanned by the three source direction vectors $u^1$. The error covariance is minimum when the vectors are orthogonal, and the estimates of s and A become unreliable as the source direction vectors $u^1$ approach the same plane. Therefore, to first order (k=1) at most three non-coplanar sources can be separated and localized with a planar array of sensors.

For arrays of larger dimensions, wave-resolving conditions support a larger number of terms k, and thus a larger number of sources L, given by the number of mixture observations up to order k in Equation 4. For a 2-D array, the maximum number of sources $L_{max}$ is $$\binom{k+2}{2} = (k+1)(k+2)/2.$$

In general, for an array in m dimensions, $$L_{max} = \binom{k+m}{m} = (k+1)\cdots(k+m)/m.$$

For instance, $L_{max}=10$ for a 3-D array with second order differentials, k=2. The difficulty in attaining larger attainable numbers of separable sources $L_{max}$ is that higher-order spatial differentiation in larger dimensions requires appreciably more discrete observations of the field on the sensor grid, (and not surprisingly) at least as many sensors as $L_{max}$.

The condition that A as determined by Equation 4 be full rank amounts to constraints on the geometry of the source direction vectors $u^1$, although less restrictive for k>1 than for k=1. For instance, only one source can lie along any given direction u for k=1.

When the number of sources present in Equation 4 is greater than the number of gradient observations, separation and localization is still possible, but requires an informative prior on the sources. In particular, a sparse ICA decomposition is obtained in the overcomplete case $L>L_{max}$ by using a Laplacian prior on the sources (Lewicki, M. S. and T. J. Sejnowski, "Learning Overcomplete Representations," *Neural Computation*, vol. 12, pp. 337–365, 2000). For example, overcomplete ICA could be directly applied on the mixture of Equation 7 to separate more than three sparse sources.

Multipath in wave propagation causes reverberation of source observations and substantially convolves the analysis. Static ICA no longer separates the sources. However, the gradient flow representation still proves useful in linearly transforming the sensor observations for improved resolution in the representation of the sources. Application of convolutive ICA (e.g., U.S. Pat. No. 5,675,659 to Torkkola, U.S. Pat. No. 6,185,309 to Attias or U.S. Pat. No. 6,424,960 to Lee, et al.) on the gradient flow transformed sensor signals yields estimates of deconvolved, separated sources along with estimates of signatures of the multipath propagation for each of the sources. The spatiotemporal nature of these signatures can be exploited to infer geometry or other spatial characteristics of the reverberant medium hosting the sources.

Although the invention has been shown and described with respect to exemplary embodiments thereof, various other changes, omissions and additions in the form and detail thereof may be made therein without departing from the spirit and scope of the invention.

Having thus described our invention, what we claim as new and desire to secure by letters patent is:

1. A method of separating and localizing sources of traveling waves, comprising the steps of:
    taking first-order or higher-order spatial derivatives of the traveling wave field in one or more directions around a given reference location in space, thereby obtaining linearly mixed time-differentiated instantaneous observations of said sources; and
    blindly separating said linearly mixed time-differentiated instantaneous observations, thereby yielding estimates of said sources and their directions.

2. The method of claim 1 wherein said observations may include a zeroth spatial derivative of said traveling wave field at said reference location, wherein said observations are optionally further time-differentiated as needed to bring the cumulative order of differentiation to a predetermined level that is identical for all observations, and wherein said sources are blindly separated by applying independent component analysis to said observations.

3. The method of claim 2 wherein said separated sources are once or repeatedly integrated to undo time differentiation to said predetermined order.

4. The method of claim 2 wherein said separated sources are localized by estimating direction cosines from the mixing matrix estimated in said application of independent component analysis.

5. The method of claim 4 wherein estimation of said direction cosines depends on wavefront curvature in the near field and attenuation in wave propagation.

6. The method of claim 2 where in said temporal differentiation is approximated by finite differences at discrete instances in time.

7. The method of claim 2 further extended to the case where said sources are subject to reverberation in multipath wave propagation, wherein said observations are convolutive in said sources, and wherein said sources are blindly separated by applying convolutive independent component analysis to said linearly mixed observations.

8. The method of claim 1 wherein said spatial derivatives are approximated by finite differences sampling said field at discrete locations in the neighborhood of said reference location.

9. The method of claim 8 wherein samples of said field at said discrete locations are collected from an array of sensors.

10. The method of claim 9 wherein said sensors are microphones or hydrophones measuring acoustic or sonar field.

11. The method of claim 9 wherein said sensors measure the component of electric or magnetic field along one direction.

12. The method of claim 11 wherein additional sensors measure the component of electric or magnetic field along a second direction, to yield additional linearly mixed observations of said sources.

13. The method of claim 9 wherein the coefficients of said samples in said finite differences are adjusted to correct for random mismatch between said sensors in said array.

14. The method of claim 1 wherein said spatial derivatives are collected from gradient sensors in the vicinity of said reference location.

15. The method of claim 14 wherein said gradient sensor is a velocity sensor measuring spatial derivative of pressure field.

16. A method of separating and localizing up to three sources of traveling waves from three linearly mixed first-order time-differentiated observations of said sources at a reference time instance comprising steps of:
    obtaining first said observation by taking a first-order spatial derivative of the traveling wave field in a first direction around a given reference location in space;
    obtaining second said observation by taking a first-order spatial derivative of said field in a second direction around said reference location;
    obtaining third said observation by taking a first-order temporal derivative of said field around said reference time instance of said observations; and
    blindly separating said observations to yield estimates of said sources and their directions.

17. The method of claim 16 wherein:
    said spatial derivative in said first direction is approximated by a difference of the field sampled at first and second locations located symmetrically on opposite sides of said reference location; and
    said spatial derivative in said second direction is approximated by a difference of the field sampled at third and fourth locations located symmetrically on opposite sides of said reference location, and orthogonal to said first and second locations with respect to said reference location.

18. The method of claim 17 wherein said field in said temporal derivative at said reference location is further approximated by estimating the spatial common mode of the field using a weighted combination of the field at said first, second, third and fourth, and reference locations.

19. The method of claim 17 wherein said samples of the field at said first, second, third and fourth location are collected from a coplanar array of four sensors, located on four corners of a square.

20. The method of claim 16 wherein said temporal derivative is approximated by the difference of the field at first and second time instances symmetrically on opposite sides of said reference time instance.

* * * * *